United States Patent [19]

Morrison et al.

[11] Patent Number: 5,504,312
[45] Date of Patent: Apr. 2, 1996

[54] SCORING SYSTEM

[75] Inventors: Anthony J. Morrison, Glasgow, Scotland; Gerard Hall, Durham, N.C.

[73] Assignee: Sportsmedia Technology Corporation, Research Triangle, N.C.

[21] Appl. No.: 163,109

[22] Filed: Dec. 7, 1993

[51] Int. Cl.[6] ............................................. G06F 15/20
[52] U.S. Cl. ........................................ 235/375; 235/487
[58] Field of Search ............................ 235/375, 381, 235/487

[56] References Cited

U.S. PATENT DOCUMENTS

| | | | |
|---|---|---|---|
| 1,224,452 | 5/1917 | Eaton et al. | |
| 3,024,043 | 3/1962 | Lyman et al. | 281/8 |
| 3,216,132 | 11/1965 | Flaherty et al. | 35/48 |
| 3,226,019 | 12/1965 | Byrnes, Jr. | 235/50 |
| 3,665,494 | 5/1972 | Baumoel | 235/156 |
| 3,982,102 | 9/1976 | Cidade | 235/487 X |
| 4,068,972 | 1/1978 | Stuart | 283/49 |
| 4,268,744 | 5/1981 | McGreary | 235/375 |
| 4,319,131 | 3/1982 | McGreary et al. | 235/375 |
| 4,367,526 | 1/1983 | McGeary et al. | 364/411 |
| 4,745,875 | 5/1988 | Timleck | 116/222 |
| 4,812,630 | 3/1989 | Harbers, Jr. | 235/448 |
| 5,127,044 | 6/1992 | Bonito et al. | 235/375 |
| 5,309,355 | 5/1994 | Lockwood | 235/381 |

*Primary Examiner*—Harold Pitts
*Attorney, Agent, or Firm*—Panitch Schwarze Jacobs & Nadel

[57] ABSTRACT

A scoring system compiles a set of statistics based on a given set of sport or performance data. A plurality of coded data items are accumulated which each identify a specific sports or performance parameter. The coded data items are contained within a predetermined format. The system employs a methodology for recording data that is easy to use does not interrupt or hinder the performance of the user. A card reader inputs and converts the coded data items into electrical signals. The inputted electrical signals are received and processed by sorting the electrical signals into a plurality of statistic categories. The electrical signals contained within each statistic category are compiled to compute statistics. The compiled statistics are outputted in a user selected manner.

12 Claims, 3 Drawing Sheets

SCORING SYSTEM

BACKGROUND OF THE INVENTION

The present invention is directed to a scoring system and, more particularly, to a scoring system for compiling statistics based on performance or event data of a sports or performance event or activity.

In many sporting events, particularly of the type involving individual participation or performance, the participants are scored or self-score their individual performance using traditional scorecards on which the specific parameters are entered utilizing a pencil, pen or other traditional writing instrument. Such scorecards are prevalent in sporting events or activities such as golf, weightlifting, etc. Specifically, many golf courses provide golfers with paper or cardboard scorecards for recording their scores during a golf game. As the golfer completes each hole in the course, he records the number of strokes for the particular hole on an appropriate area of the card. Typically, the score is handwritten onto the card. At the end of the game, the golfer manually adds up the number of strokes for each hole to get his total score.

Once the game is completed and the golfer tabulates his score, the card is typically discarded. The only data usually retained, if any, is the golfer's overall score and his handicap. The golfer has no written record of his personal statistics for the game, such as the number of Putts, Greens in Regulation, Up and Downs, Sand Saves, Approach Shot Accuracy, or Tee Shot Accuracy. Furthermore, no statistics can be compiled for the golfer over time or for all of the golfers playing on the golf course. Analysis of data collected from a number of rounds of golf played by an individual or a number of different golfers could reveal the relative playing severity of the golf course on a hole by hole basis as experienced by various golfers in different handicap classes which could be useful to the owners of the golf course as well as the individual golfers.

There is a need for a scoring system for golf and many other sporting and/or performance events or activities which is capable of compiling a detailed set of statistics based on a given set of data for a particular event or activity. The statistics can relate either to a particular individual, a group of individuals, or the overall event or activity. The scoring system should include a scoring card which is weather and perspiration resistant and is capable of easily recording a given set of statistics without hindering, interrupting or otherwise impeding the sporting or performance event. The scoring card should be capable of being read by a card reader which is associated with a host computer system for receiving the data read from the scoring card and compiling the data to form a data output describing the sport or performance statistics.

SUMMARY OF THE INVENTION

Briefly stated, the present invention comprises a scoring system for compiling a set of statistics based on a given set of sports and/or performance events and/or activities data. The scoring system includes data accumulating means for accumulating a plurality of coded data items with each identifying a parameter associated with at least one sport or performance event or activity by at least one participant. The coded data items are accumulated by the data accumulating means in a predetermined format. Means are provided for entering the coded data items into the data accumulating means. Data input means receive the coded data items from the data accumulating means and convert the coded data items into electrical signals. Processing means receive and process the electrical signals. The electrical signals are sorted into a plurality of statistic categories. Statistics are compiled based upon the electrical signals contained within each statistic category. Means are provided for outputting the completed statistics in a user selected manner.

The present invention is also directed to a scoring card for use in a sports and/or performance event and/or activity scoring system for compiling a set of statistics based on a given set of sports and/or performance data. The scoring card comprises a first generally planar layer having a plurality of spaced openings arranged in a series of generally parallel rows and columns. A second layer is made from a generally thin puncturable material and is secured to a first surface of the first layer. Identifying means which identify parameters associated with a sport or performance event or activity are arranged in a column and placed adjacent to the columns of spaced openings. Statistic labeling means are arranged in a row adjacent to the rows of spaced openings for labeling a plurality of sport or performance statistics. A sports or performance parameter is recorded by puncturing the second layer located at a particular spaced opening associated with a particular sports and/or performance event and/or activity statistic.

BRIEF DESCRIPTION OF THE DRAWINGS

The foregoing summary, as well as the following detailed description, will be better understood when read in conjunction with the appended drawings. For the purpose of illustrating the invention, there is shown in the drawings embodiments which are presently preferred, it being understood, however, that the invention is not limited to the specific methods and instrumentalities disclosed.

In the drawings.

DETAILED DESCRIPTION OF PREFERRED EMBODIMENTS

Figure 1:
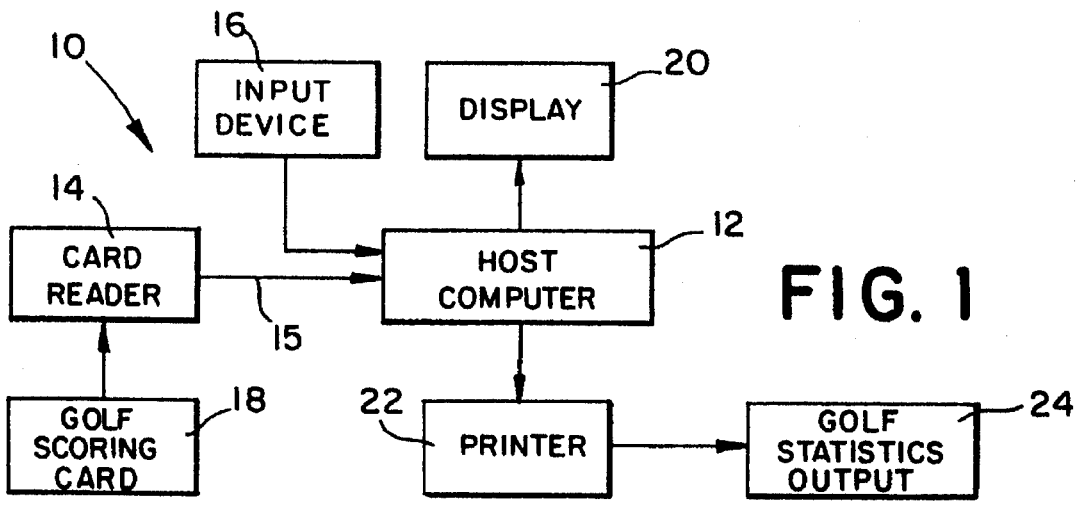
FIG. 1 is a functional schematic block diagram of a golf scoring system in accordance with the present invention.

Referring to the drawings, wherein like numerals indicate like elements throughout, there is shown in FIG. 1 a functional schematic block diagram of a scoring system 10 in accordance with the present invention. In the present embodiment, the scoring system 10 is employed for scoring golf although it will be appreciated that the scoring system 10 could be used for other sports and/or performance events and/or activities. Thus, while the following description relates to a system 10 for scoring golf and a golf scoring card for use in such a golf scoring system, the invention is not so limited and may be employed for scoring many other types of sports and/or performance events and/or activities having identifying parameters, including weightlifting, track meets, road races, etc.

The golf scoring system 10 of the present embodiment includes a host computer 12 which receives and compiles a set of golf statistics based on a given set of golf data. The golf data can relate either to a particular individual golfer or group of golfing individuals, a particular golf course or a comparison between different golf courses. In the preferred embodiment, the host computer 12 is a personal computer, such as, but not limited to an IBM or IBM compatible personal computer, which includes a processor (not shown); memory, including random access memory and long-term memory such as a hard disk (not shown); an operating system; and the like. However, it is to be understood by those skilled in the art that any type of computer or microcomputer could be used without departing from the scope and spirit of the present invention.

Data relating to golf events is received by the host computer 12 and is preferably entered by way of a card reader 14 and/or some other type of input means or device 16. In the preferred embodiment, the card reader 14 is a light sensitive device, preferably a photodiode reader. However, it is to be understood by those skilled in the art that any type of card reader could be used such as, but not limited to, a magnetic card reader, scanner or a bar code reader. Alternatively, any other type of input device could be used to enter golf data into the host computer. A data accumulating means, in the present embodiment a golf scoring card 18 (hereinafter described), is received by the card reader 14 for the input of data relating to golf event parameters to the host computer 12. The card reader 14 scans the golf scoring card 18, converts the data scanned from the scoring card 18 into electrical signals and transmits the electrical signals representative of the scanned data to the host computer 12. Once the card reader 14 has scanned all of the data from the golf scoring card 18, the golf scoring card 18 can either be manually or automatically removed from the card reader 14.

An input device 16 such as, by not limited to, a keyboard or hexadecimal key pay, can also be connected to the host computer 12 for control of the host computer 12 and for inputting additional data. It is to be understood by those skilled in the art that the input device 16 can be any other suitable type of input device, such as a laser pen, scanner or mouse without departing from the scope and spirit of the present invention. Data which can be inputted by the input device 16, in addition to the golf parameter data, can include, but is not limited to, the individual's name, address, or membership identification number for a particular golf course as well as instructions, such as READ DATA CARD, etc., for controlling operation of the host computer 12, card reader 14 and associated devices.

Once all of the data for a particular golfer or a plurality of golfers have been inputted into the host computer 12, the data in the form of electrical signals are processed or compiled by a processor means or microprocessor (not shown) contained within the host computer 12. The microprocessor sorts the electrical signals into a plurality of golf statistic or parameter categories. The golf statistic categories include, but are not limited to, the score for each hole, the total score, the number of lost balls, the number of putts and other golf hazards which may occur during the course of the game. It is to be understood by those skilled in the art that any golf statistics or parameters may be included without departing from the scope and spirit of the present invention. The golf statistics are compiled based on the number and type of golf statistics contained within each golf statistic category, such as the number of putts made during the golf game.

The compiled golf statistic categories are shown on a display 20 associated with the host computer 12. The display 20 can be any type of suitable display such as, but not limited to, a CRT monitor, an LCD display, or an LED display without departing from the scope and spirit of the present invention. Preferably, the golf statistics are displayed in a manner which is easily readable such as a column and row format. The golf statistics can also be maintained in the memory or hard disk of the host computer 12 for future reference or to compile additional golf statistics, such as long term statistics for an individual golfer or course statistics for a plurality of golfers. The golf data may also be continuously updated during a tournament event to provide a display of scoring information, as well as other facts and figures during the course of play.

A printer 22 is also associated with the host computer 12 for producing a hard copy of the golf statistics displayed on the display 20. The hard copy can be produced on any suitable material, such as, but not limited to, a sheet of paper, a postcard or an index card. A golf statistic output 24, including all the compiled golf statistics for a given golfer, is outputted by the printer 22 for future reference. The golf statistic output 24 may be arranged in any user selected manner, such as, but not limited to, by overall statistics compiled for each golf statistic category or by the statistics compiled for each hole of the golf course.

Figure 2:
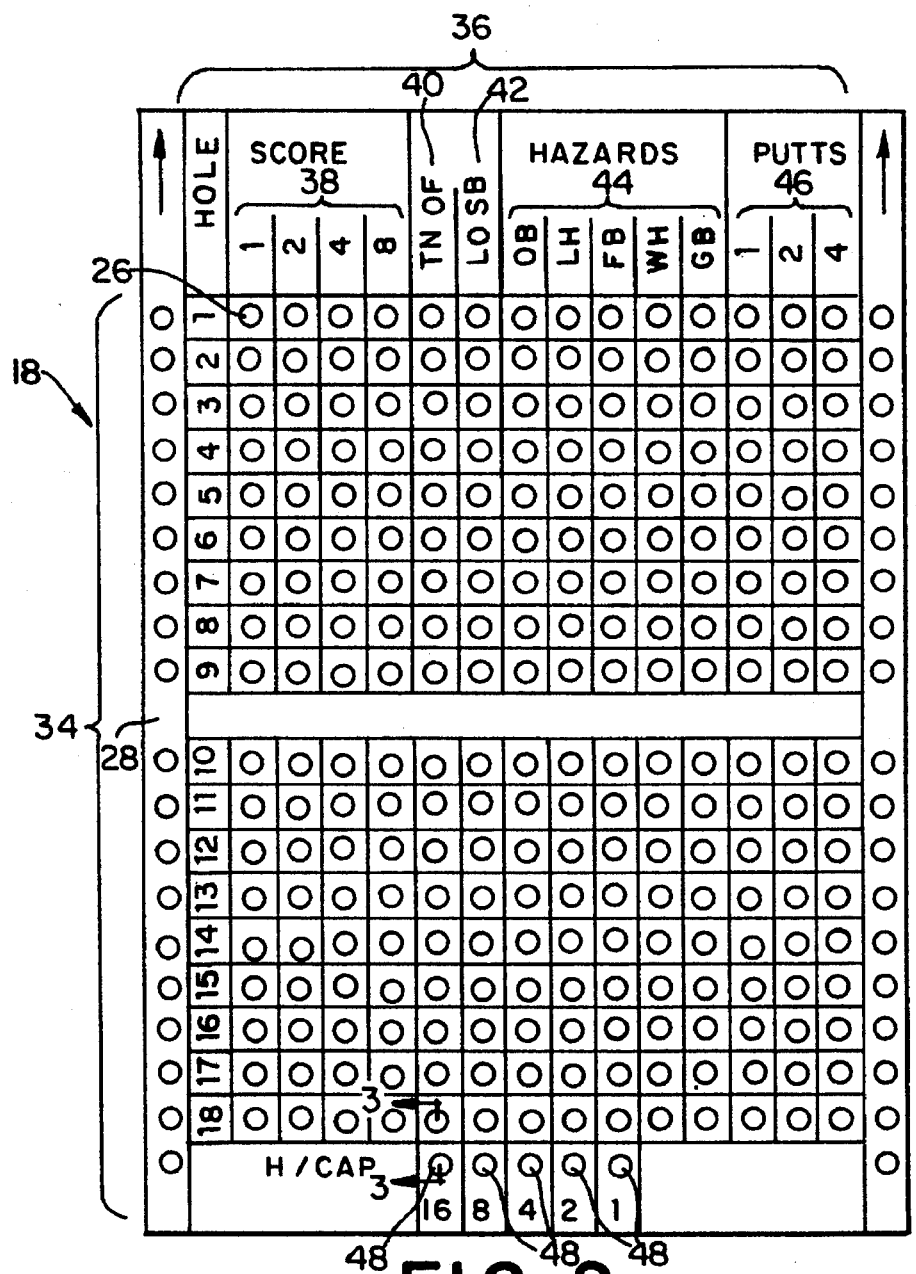
FIG. 2 is a top plan view of a first embodiment of a golf scoring card of a type which may be used in a golf scoring system.
Figure 3:
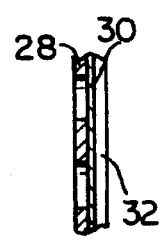
FIG. 3 is a partial sectional view of the golf scoring card taken along line 3—3 of FIG. 2.

Referring to FIG. 2, there is shown a first preferred embodiment of a scoring card 18 in accordance with the present invention. While the present embodiment of the scoring card 18 is for golf, it will be appreciated that the same or substantially the same scoring card, with minor modifications, could be alternatively employed for other sports and/or performance events or activities.

The golf scoring card 18 can either be a reusable card or a disposable card. The card 18 is preferably sized to be commensurate with the size of a traditional golf scorecard which may be provided by the golf course. The scoring card 18 is preferably rectangularly shaped and comprises a first generally planar layer 28, in the present embodiment the top layer which faces a golfer during normal use. If the card 18 is a disposable card, the first layer 28 is preferably made of an inexpensive, lightweight, easily disposable material, such as cardboard or heavy paper which is preferably covered or coated by a plastic film (not shown) such that the card is resistant to damage from dirt or moisture. If the card 18 is a reusable card, then the first layer 28 is preferably made of a polymeric material, such as plastic, vinyl, or some other suitable, durable material which may by reused a significant number of times. It is to be understood by those skilled in the art that the card 18 may be made out of any suitable material without departing from the scope and spirit of the present invention.

Secured to a first or bottom surface of the first layer 28 is a second layer 32. The second layer 32 is also generally planar and is sized and shaped to generally correspond to the first layer 28. The second layer 32 is preferably made of a thin easily puncturable material, such as paper, plastic or a metallic foil, such as aluminum foil. Preferably, the second layer 32 is secured to the first layer 28 using a suitable adhesive 30 applied to the second layer 32 so that the second layer 32 may be easily removed and replaced after use with a new second layer. Alternatively, the second layer 32 may be sandwiched between the first layer 28 and a third layer (not shown) having essentially the same size and shape as the first layer 28. If a third layer is employed, the second layer 32 may be slidably received between the first and third layers to facilitate removal and replacement of the second layer 32. The second layer 32 may either be of a single color or a plurality of colors to identify various golf statistic data categories.

The first layer 28 includes a plurality of generally spaced openings or holes 26 which in the present embodiment are generally circular shaped but may be of any other shape if desired. Preferably, the holes 26 are arranged in a series of generally parallel rows 34 and columns 36 in order to provide an organized chart-like appearance. In the preferred embodiment, each column of holes 26 or groups of columns of holes may be a different color to easily identify each golf statistic category. Each row 34 is identified on the left end by a hole number ranging from 1 to 18 for corresponding with the particular hole being played on a golf course. The columns 36 of the scoring card 18 are each identified by a particular golf statistic or parameter. It is to be understood by those skilled in the art that the statistics identified and the particular arrangement of the rows, columns and statistics is arbitrary and is shown on FIG. 2. merely for the purpose of illustrating a preferred scoring card 18. The particular arrangement of the scoring card 18, therefore, should not be viewed as being a limitation upon the scope and spirit of the present invention.

Located adjacent to the number of each golf hole is a plurality of columns 38 designated for recording the total golf score for a particular hole. In the preferred embodiment, the golf score is recorded in binary form and comprises up to four digits allowing for a total score of up to 15 to be recorded for each golf hole. Located adjacent to the score columns 38 are a pair of columns 40, 42 designated for identifying if a tee shot did not land on the fairway (TNOF), or if a lost ball (LOSB) occurred for a particular hole. Another group of columns 44 are designated for identifying various hazards which could occur during the play of a particular hole on the golf course. These hazards include, but are not limited to, a ball which goes out of bounds (OB), a lateral hazard (LH), a fairway bunker (FB), a water hazard (WH), and a greenside bunker (GB). Another group of columns 46 are designated for recording the number of putts which occur during the play of each particular hole. In the preferred embodiment, the putts are also recorded in binary form and comprise up to three digits allowing for up to seven putts to be recorded for a given hole. A separate set of holes 48 are also arranged on the score card 18, preferably at the bottom end, for recording the handicap for a given player. The handicap is also preferably recorded in binary form and allows for a handicap of up to 32. In the present embodiment, the top surface of the first layer 28 is imprinted, embossed or otherwise marked with suitable indicia or legends to identify the particular golf parameters associated with the various columns of the scoring card and to identify the hole numbers associated with each of the rows 34 of the scoring card 18.

Figure 5:
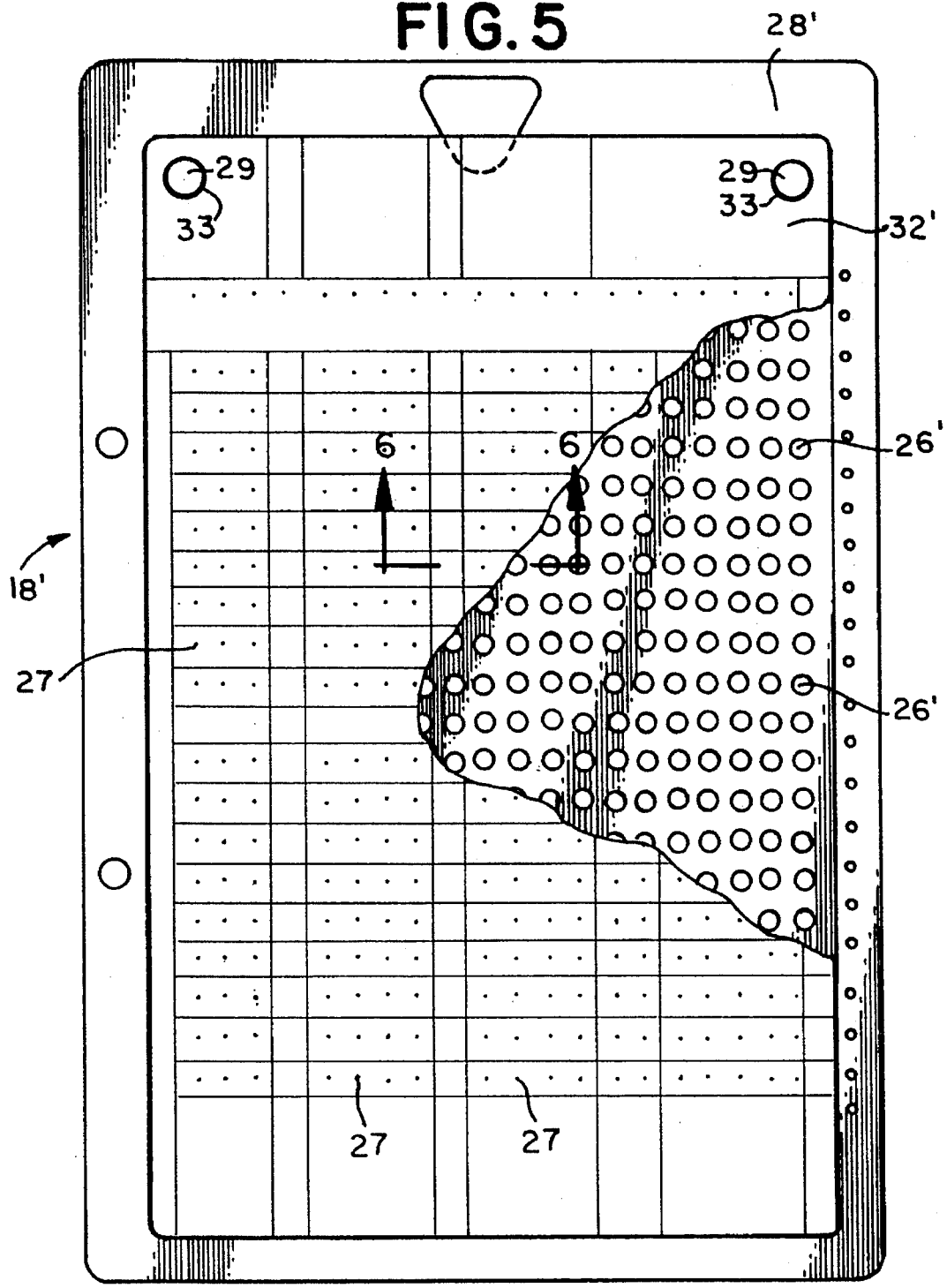
FIG. 5 is a top plan view of a second embodiment of a golf scoring card.
Figure 6:
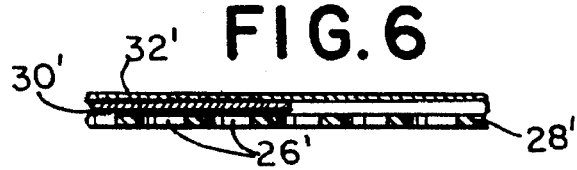
FIG. 6 is a partial sectional view of the golf scoring card of FIG. 5 taken along line 6—6.

FIGS. 5 and 6 illustrate a second preferred embodiment of a golf scoring card 18' in accordance with the present invention. Again, while the embodiment of the scoring card 18' as shown in FIGS. 5 and 6 is for golf, it will be appreciated that the same or substantially the same scoring card, with minor modifications, could be alternatively employed for other sport and/or performance events or activities.

The golf scoring card 18' is sized to be commensurate with the size of a traditional golf score card which may be provided by a golf course. The scoring card 18' is preferably rectangularly shaped and comprises a first generally planar layer 28' which preferably is formed of an inexpensive, lightweight reusable material such as a polymeric material. Secured to a first surface of the first layer 28' is a second layer 32' preferably formed of a thin, easily puncturable material, such as paper, plastic or a metallic foil such as aluminum foil. Preferably, the second layer 32' is secured to the top or upper surface of the first layer 28' such that the second layer 32' faces the golfer during normal use. Preferably, the second layer 32' is secured to the first layer 28' utilizing a suitable adhesive 30' of the type that permits the second layer 32' to be easily removed and replaced after use with a new second layer.

As with the first embodiment, the first layer 28' includes a plurality of generally spaced openings or holes 26' which in the present embodiment are preferably circular but may be of any other shape desired. The holes 26' are formed into a plurality of columns and rows just as with the first embodiment. However, unlike the first embodiment, in the second embodiment, the top surface of the second layer 32' is imprinted, embossed, or otherwise marked with the indicia or legends to indicate the particular golf parameters associated with the various columns and rows of the scoring card. A plurality of small dots 27 are also provided on the top surface of the second layer 32' and generally in alignment with the holes 26' of the first layer 28'. In order to facilitate proper alignment of the dots 27 with the holes 26', a pair of spaced, outwardly extending bosses 29 on the top surface of the first layer 28' are provided for receiving a pair of suitably sized, spaced openings 33 extending through the second layer.

During play, a golf player enters his score and other identified golf statistics or parameters onto the golf scoring card 18, 18' either during or after each golf hole is played. The data is entered by merely puncturing through the second layer 32, 32' of each appropriate hole 26, 26' with a small, blunt instrument such as, but not limited to, a golf tee, pencil or other implement. At the end of the golf game, the card 18, 18' should be coded, i.e., the second layer 32, 32' at the appropriate holes should be punctured, with all the golf data entered during play.

The coded golf scoring card 18, 18' is placed in the card reader 14 which converts the coded data into electrical signals. The scoring card 18, 18' may be reused (if reusable) after being read by the card reader 14 by peeling off the remainder of the second layer 32, 32' and placing a new, unpunctured second layer on the rear surface of the first layer 28, 28'. The electrical signals are transferred by a suitable interface 15 such as, but not limited to, an RS232 cable to the host computer 12. If additional information is required, it may be entered by the input device 16 which transmits the additional data to the host computer 12 in the form of electrical signals.

The electrical signals received from the card reader 14 are processed by the host computer 12 and sorted into their appropriate golf statistic category. In the preferred embodiment, each electrical signal is coded to identify the particular golf statistic category to which it pertains. Once the electrical signals are sorted, the overall golf statistics for each golf statistic category is compiled.

The compiled golf statistics may be displayed on a display 20 in a row and column format to indicate the computed golf statistics for each golf hole as well as the total golf statistics for the entire game. The compiled golf statistics may also be printed out in the same column and row format on paper or a suitable card.

As well as receiving the golf statistics for a particular golf game played, a player may request to see an accumulated version of his golf statistics over a number of games. Another possibility is to compare the golf statistics of a number of golf players of similar or varying skill for a given golf course. A user of the golf scoring system can also compare different golf courses to determine comparable complexity and challenge for a particular hole or the overall course. Such information can be useful in determining if a particular golf hole is too easy or too difficult. For a given golf player, the player may be able to determine his strengths or weaknesses by analyzing his golf statistics by category over a number of games.

Figure 4:
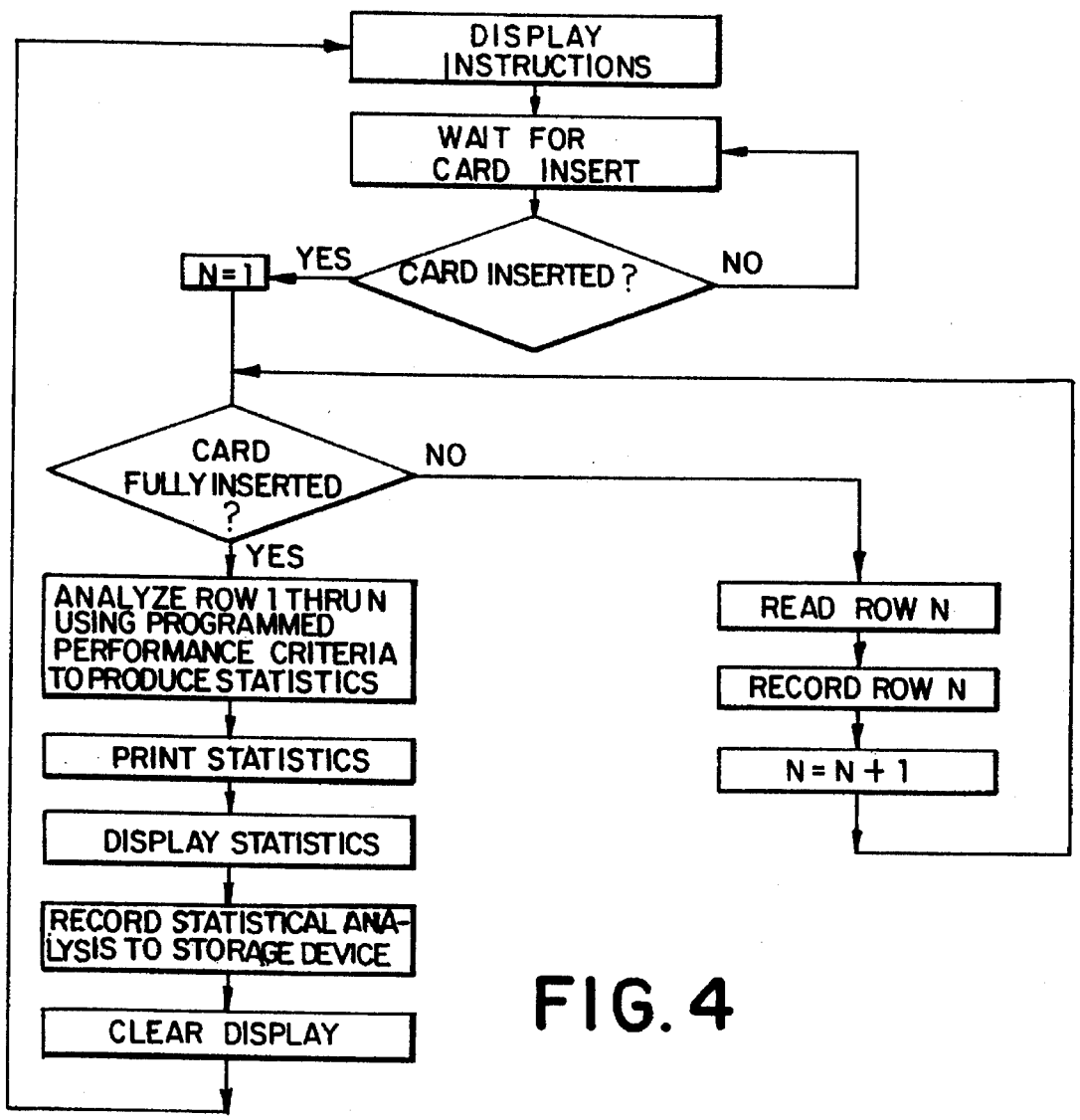
FIG. 4 is a flow chart depicting the compiling of the statistics obtained in the scoring system of FIG. 1 utilizing the golf scoring card of FIG. 2.

Referring to FIG. 4, there is shown a basic, functional flow diagram depicting the manner in which golf statistics are compiled by the golf scoring system 10 using the scoring card 18 and the host computer 12. Further details of the structure and operation of the computer software will be readily apparent to those skilled in the art.

From the foregoing description, it can be seen that the present invention comprises a sport scoring system for compiling a set of sport and/or performance statistics based on a given set of sport or performance data. It will be recognized by those skilled in the art that changes may be made to the above-described embodiment of the invention without departing from the broad inventive concept thereof. It is understood, therefore, that this invention is not limited to the particular embodiments disclosed, but is intended to cover all modifications which are within the scope and spirit of the invention as defined by the appended claims.

We claim:

1. A scoring card for use in a sport and/or performance event or activity scoring system for compiling a set of statistics based on a given set of sports or performance data, the scoring card comprising:

a first generally planar layer having a plurality of spaced openings arranged in a series of generally parallel rows and columns;

a second layer made from a generally thin, puncturable material and secured to a first surface of the first layer;

identifying means for identifying parameters associated with a sport or performance event or activity, said identifying means being arranged in a column and placed adjacent to the columns of spaced openings; and statistic labeling means arranged in a row adjacent to the rows of spaced openings for labeling a plurality of sport or performance statistics, each statistic being associated with at least one column of spaced openings, wherein a sport or performance statistic is recorded by puncturing the second layer located at a particular spaced opening associated with a particular sports or performance event or activity statistic.

2. A scoring card according to claim 1, wherein said first layer is a polymeric material.

3. A scoring card according to claim 1, wherein said second layer is made from a metal foil.

4. A scoring card according to claim 1, wherein said second layer is made from a puncturable vinyl.

5. A scoring card according to claim 1, wherein the sport is golf and the statistics include the number of lost balls.

6. A scoring card according to claim 5, wherein the statistics include the number of balls which went out of bounds.

7. A scoring card according to claim 6, wherein the statistics include the number of tee shots not on the fairway.

8. A scoring card according to claim 7, wherein the statistics include the number of lateral hazards.

9. A scoring card according to claim 8, wherein the statistics include the number of water hazards.

10. A scoring card according to claim 9, wherein the statistics include the number of greenside bunkers.

11. A scoring card according to claim 10, wherein the statistics include the number of fairway bunkers.

12. A scoring system for compiling a plurality of golf statistical information comprising:

a score card comprising a first generally planar layer having a plurality of spaced openings arranged in a series of rows and columns and a second layer made from a puncturable material and secured to a first surface of the first layer, golf hole number identifying means for identifying a golf hole, said hole identifying means arranged in a column and placed adjacent to the columns of spaced openings, and statistic labeling means arranged in a row adjacent to the rows of spaced openings for labeling the golf statistics, each statistic being associated with at least one column of spaced openings, wherein a statistic is recorded by puncturing the second layer at a particular spaced opening associated with the particular statistic for a particular golf hole number;

data input means for receiving the score card and reading the statistical information from the score card and converting said statistical information into electrical signals;

processing means for receiving and processing said electrical signals, said electrical signals being sorted into a plurality of statistic categories, said statistics being compiled based upon the electrical signals contained within each statistic category; and means for outputting the compiled statistics in a user selected manner.

* * * * *